United States Patent [19]
McAlister, II

[11] Patent Number: 5,941,585
[45] Date of Patent: Aug. 24, 1999

[54] HANDLE APPARATUS FOR LIFTING AND STEERING A PINTLE TOWED DOLLY

[76] Inventor: Franklin A. McAlister, II, 3520 Magness La., Knoxville, Tenn. 37920-9715

[21] Appl. No.: 09/075,870

[22] Filed: May 11, 1998

[51] Int. Cl.⁶ .................. B62B 5/06; B65G 7/00
[52] U.S. Cl. .......................................... 294/15; 280/47.17
[58] Field of Search ................ 294/15, 19.1; 280/47.17, 280/47.315, 47.371, 414.1, 416.1; 16/111 R, 114 R

[56] References Cited

U.S. PATENT DOCUMENTS

| | | | |
|---|---|---|---|
| 2,535,468 | 12/1950 | Von Bank | 294/19.1 |
| 2,869,885 | 1/1959 | Doyle, Jr. | 280/47.17 |
| 3,612,555 | 10/1971 | Baker | 280/47.17 |
| 3,622,181 | 11/1971 | Smith | 280/414.1 |
| 3,850,442 | 11/1974 | Wehner | 280/47.371 |
| 4,645,224 | 2/1987 | Poganski | 294/15 |

*Primary Examiner*—Dean Kramer
*Attorney, Agent, or Firm*—David L. Volk

[57] ABSTRACT

A tube is adapted to fit conformingly within a pintle ring of a tongue of a dolly. The tube extends outwardly from an upper surface of a base plate. A pin is positioned within the tube and extends outwardly from the upper surface of the base plate. A holding plate is adapted to fasten to the pin, capturing the pintle ring between the holding plate and the base plate. A handle is connected to a bottom surface of the base plate for lifting the base plate when the pintel ring is captured between the holding plate and the base plate. The configuration of the base plate is such that the base plate is held to the pintle ring in a non-rotatable manner.

5 Claims, 6 Drawing Sheets

HANDLE APPARATUS FOR LIFTING AND STEERING A PINTLE TOWED DOLLY

BACKGROUND OF THE INVENTION

1. Field of the Invention

The present invention relates to handles for dolly and trailer tongues.

2. Description of the Related Art

Vans and other cargo are often transported on pintle towed dollies, called mobilizers, in the military. These dollies are often manually moved into position, while the dollies are carrying heavy loads. The tongues of these dollies weigh in excess of 100 pounds, and the tongues have no convenient hand holds. The process of manually moving these dollies is cumbersome, difficult, and can result in physical injuries such as back strains, and foot injuries if the tongue is dropped.

SUMMARY OF THE INVENTION

The handle apparatus of the present invention includes a base plate. A tube extends outwardly from the upper surface of the base plate, and is adapted to fit conformingly within a pintle ring of a tongue of a dolly. A pin is positioned within the tube and extends outwardly from the upper surface of the base plate. A holding plate is adapted to fasten to the pin, capturing the pintle ring between the holding plate and the base plate. A handle is connected to a bottom surface of the base plate for lifting the base plate when the pintle ring is captured between the holding plate and the base plate. The handle extends outwardly from opposing sides of the base plate. The configuration of the base plate is such that the base plate is held to the pintle ring in a non-rotatable manner.

Because the base plate is held to the pintle ring in a non-rotatable manner, the dolly is easily steered by persons grasping the handle on each of the opposing sides of the base plate.

Still further features and advantages will become apparent from the ensuing description and drawings.

DETAILED DESCRIPTION

Figure 1:
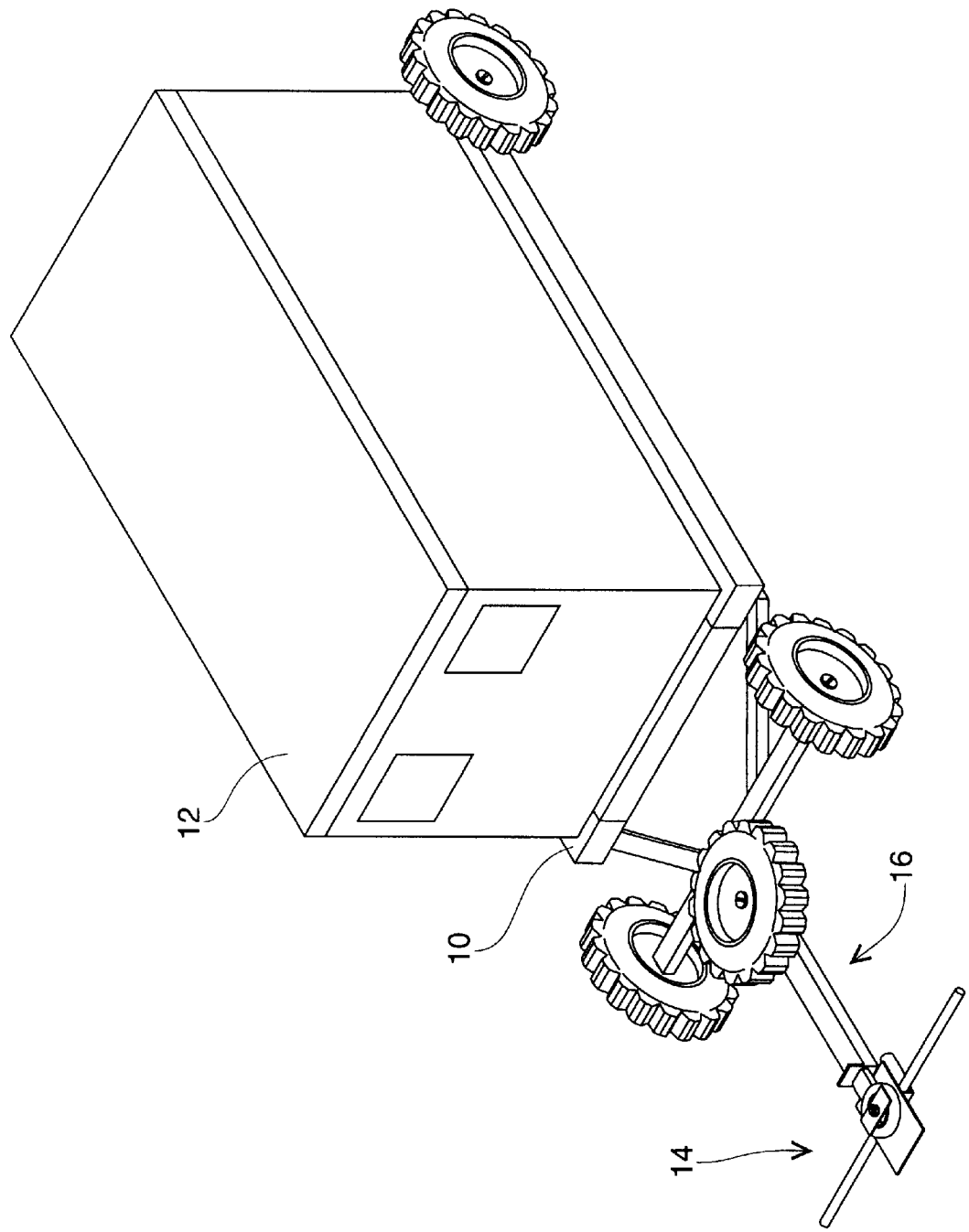
FIG. 1 is a perspective view of a pintle towed dolly carrying a load, with the handle apparatus of the present invention connected to a tongue of the dolly.

FIG. 1 is a perspective view of a pintle towed dolly 10 carrying a load 12, with a handle apparatus 14 of the present invention connected to a tongue 16 of the dolly 10.

Figure 2:
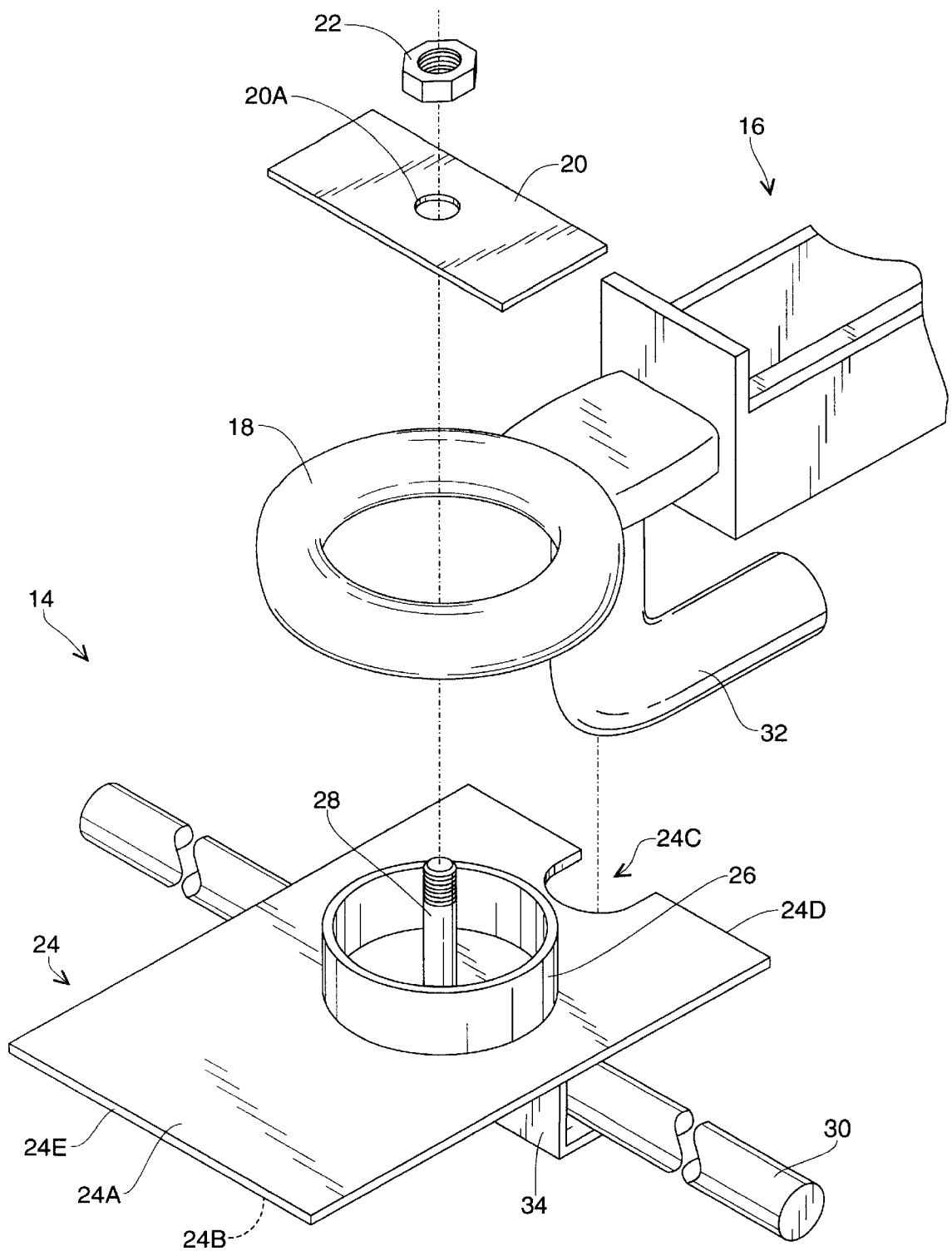
FIG. 2 is an exploded perspective view of the handle apparatus and the pintle ring of the tongue of the dolly.
Figure 2A:
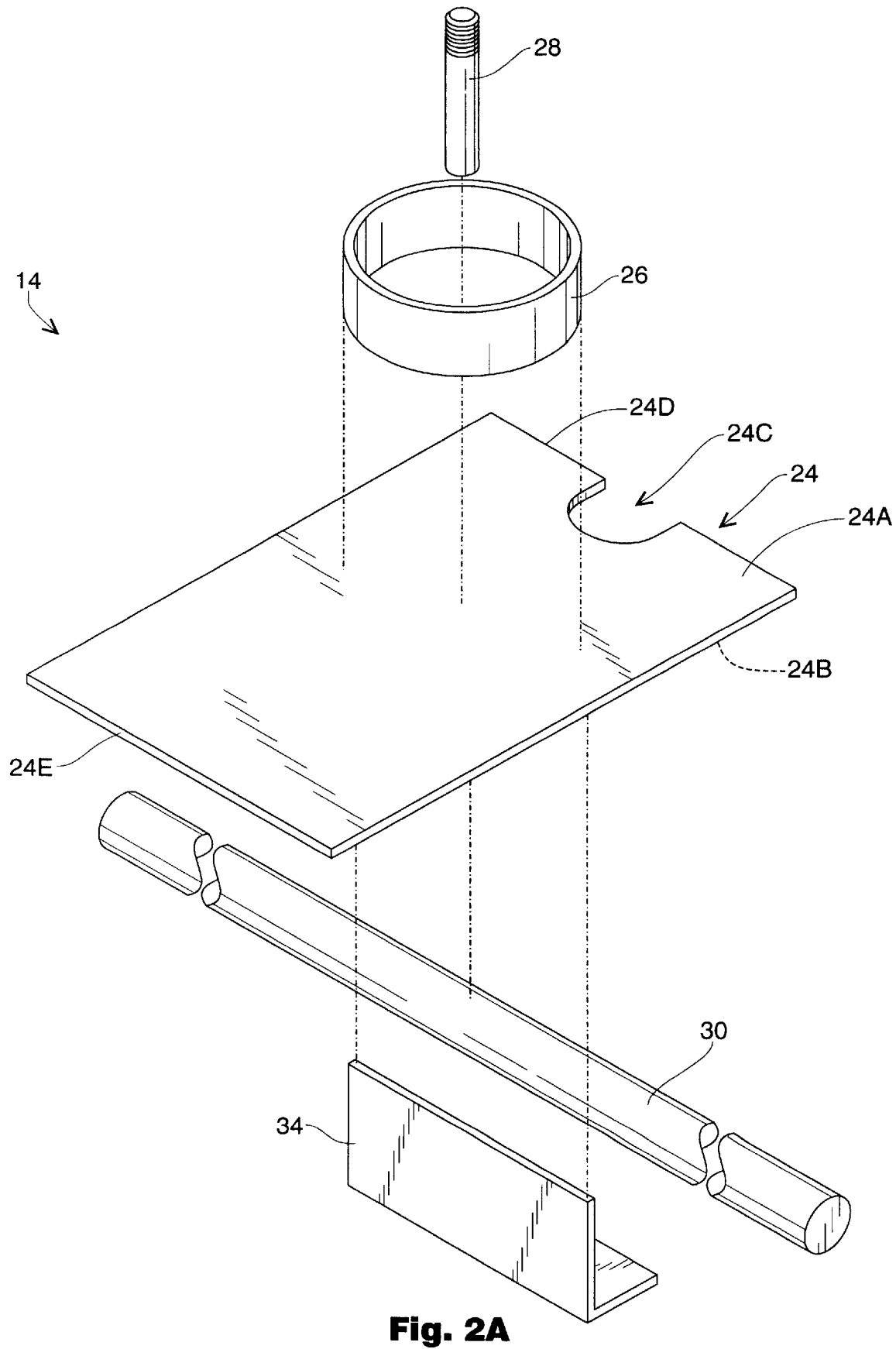
FIG. 2A is an exploded perspective view of the handle apparatus, shown without the holding plate and the fastener.

FIG. 2 is an exploded perspective view of the handle apparatus 14 and a pintle ring 18 at a distal end of the tongue 16. FIG. 2A is an exploded perspective view of the handle apparatus 14, shown without a holding plate 20 and a fastener 22, which are shown in FIG. 2. FIG. 2A is provided to show the handle apparatus 14 in greater detail. Referring to FIGS. 2 and 2A, the handle apparatus 14 includes a base plate 24 having a first broad surface 24A opposite a second broad surface 24B. A tube 26 extends outwardly from the first broad surface 24A of the base plate 24. The tube 26 is adapted to fit conformingly within the pintle ring 18.

A pin 28 is positioned within the tube 26 and extends outwardly from the first broad surface 24A of the base plate 24. The holding plate 20 has an aperture 20A therein, and fits over the pin 28. The holding plate 20 is fastened over the pintle ring by attaching the fastener 22 to a distal end of the pin 28. In the figure shown, the pin 28 is a threaded bolt, and the fastener 22 is a nut. Other known structures, such as a cotter pin fitted through an aperture in the distal end of the pin 28. are possible. The holding plate 20 captures the pintle ring 28 between the holding plate 20 and the base plate 24.

A handle 30 is connected to the second broad surface 24B of the base plate 24, for lifting the base plate 24 and the pintle ring 18. The handle 30 is a generally straight, generally bar shaped member connected to the second broad surface 24B of the base plate 24. The handle 30 extends outwardly from opposing sides of the base plate 24.

A notch 24C is included in a first end 24D of the base plate 24. The notch 24C is adapted to receive a bar 32 which depends downwardly from the tongue 16 of one known particular type of military dolly. This structure keeps the base plate 24 from rotating with respect to the pintle ring 18.

Figure 2B:
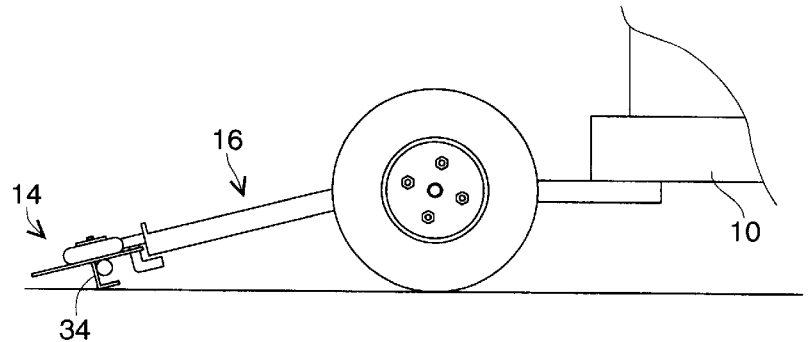
FIG. 2B is a partial side elevational view of the pintle towed dolly, with the tongue tilted downward and the handle apparatus resting on grade.

A support member 34 is connected to the second broad surface 24B of the base plate 24. The support member 34 is adapted to rest on grade, maintaining the handle 30 above grade when the handle apparatus 14 is connected to the tongue 16, and the tongue 16 is tilted downward, as shown in FIG. 2B.

Figure 3:
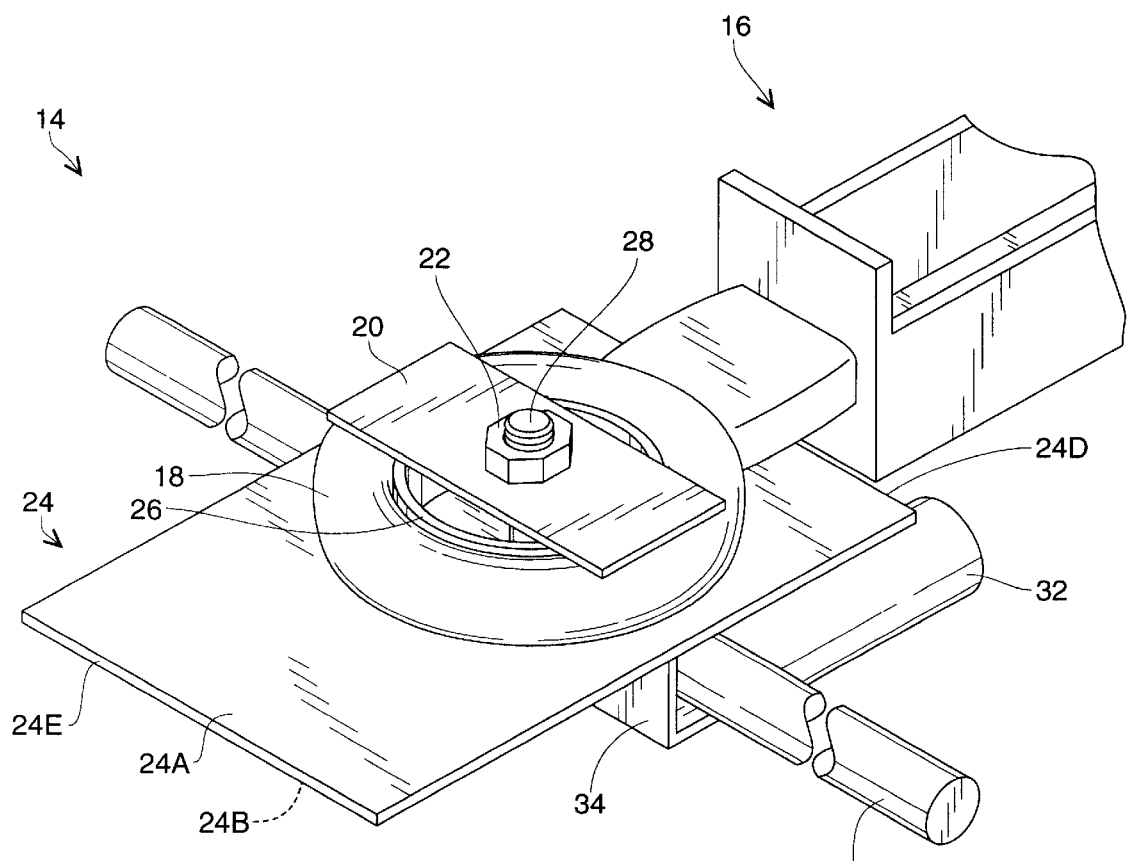
FIG. 3 is a perspective view of the handle apparatus attached to the pintle ring.

FIG. 3 is a perspective view of the handle apparatus 14 attached to the pintle ring 18.

Figure 4:
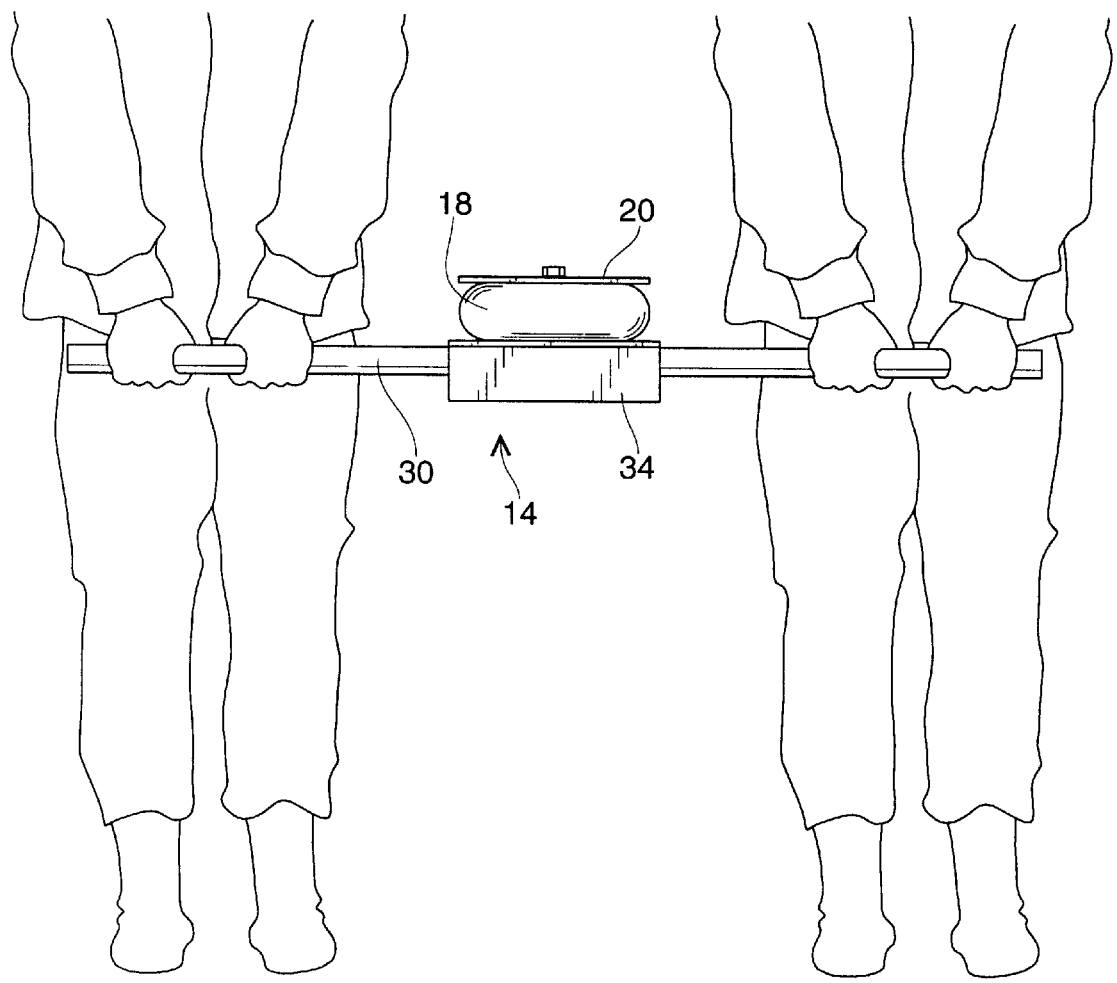
FIG. 4 is a partial front elevational view showing the handle apparatus being used, with the tongue raised off grade and ready for transport.

FIG. 4 is a partial front elevational view showing the handle apparatus 14 being used, with the tongue 16 raised off grade and ready for manual transport. Although not shown, the main part of the dolly 10, and the load 12, would be behind the people shown in the drawing.

Figure 5:
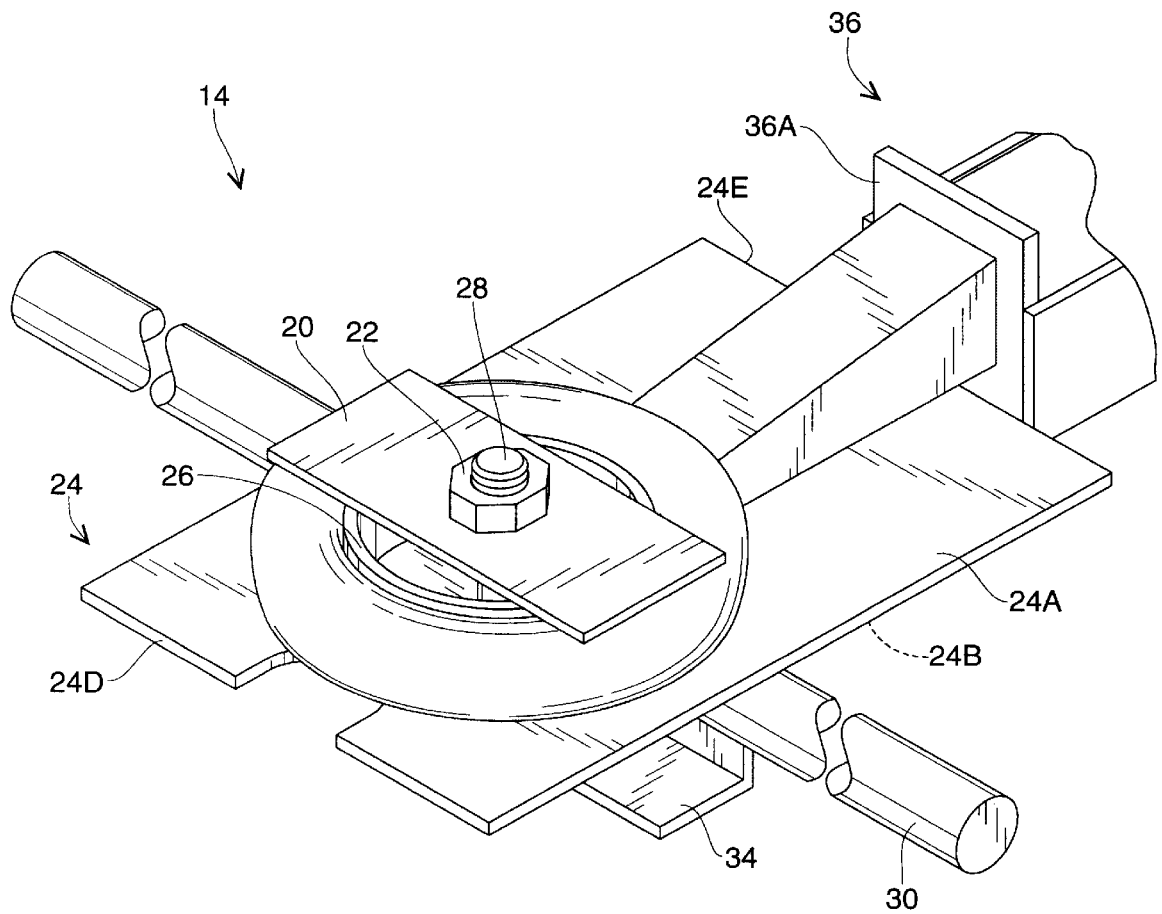
FIG. 5 is a partial perspective view of the handle apparatus attached to a differently configured tongue of a dolly.

FIG. 5 shows the handle apparatus 14 in use on another known type of tongue 36. This type of tongue 36 does not have the bar 32 shown in FIG. 2. The handle apparatus 14 is attached to the tongue 36 in such a manner that the second end 24E of the base plate 24 abuts a forward facing structural plate 36A of the tongue 36. This provides a similar result to that of the notch 24C described above, that is, the base plate 24 is kept from rotating with respect to the tongue 36.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A handle apparatus for lifting and towing a pintle towed dolly comprising:
   a. a base plate having a first broad surface opposite a second broad surface;
   b. a tube adapted to fit conformingly within a pintle ring of a tongue of a dolly;

c. the tube extending outwardly from the first broad surface of the base plate;
d. a pin positioned within the tube and extending outwardly from the first broad surface of the base plate;
e. a holding plate adapted to fasten to the pin, capturing the pintle ring between the holding plate and the base plate; and
f. a handle connected to the base plate for lifting the base plate when the pintle ring is captured between the holding plate and the base plate.

2. The handle apparatus of claim 1, wherein the handle is a generally straight, generally bar shaped member connected to the second broad surface of the base plate, the handle extending outwardly from opposing sides of the base plate.

3. The handle apparatus of claim 1, wherein the base plate includes a notch at a first end thereof, the notch adapted to receive a bar which depends downwardly from the tongue when the dolly is upright.

4. The handle apparatus of claim 1, further comprising a support member adapted to rest on a grade, maintaining the handle above the grade when the apparatus is connected to the tongue of the dolly and the tongue of the dolly is tilted downward.

5. The handle apparatus of claim 1, wherein the base plate is adapted to abut a portion of the tongue in such a manner as to prevent the base plate from rotating with respect to the pintle ring, when the pintle ring is captured between the holding plate and the base plate.

* * * * *